May 10, 1966
D. A. PERINO
3,250,384
MULTIPLE LAYER RUPTURABLE PACKAGING
FILM AND CONTAINERS THEREFROM
Filed Jan. 27, 1964
2 Sheets-Sheet 1
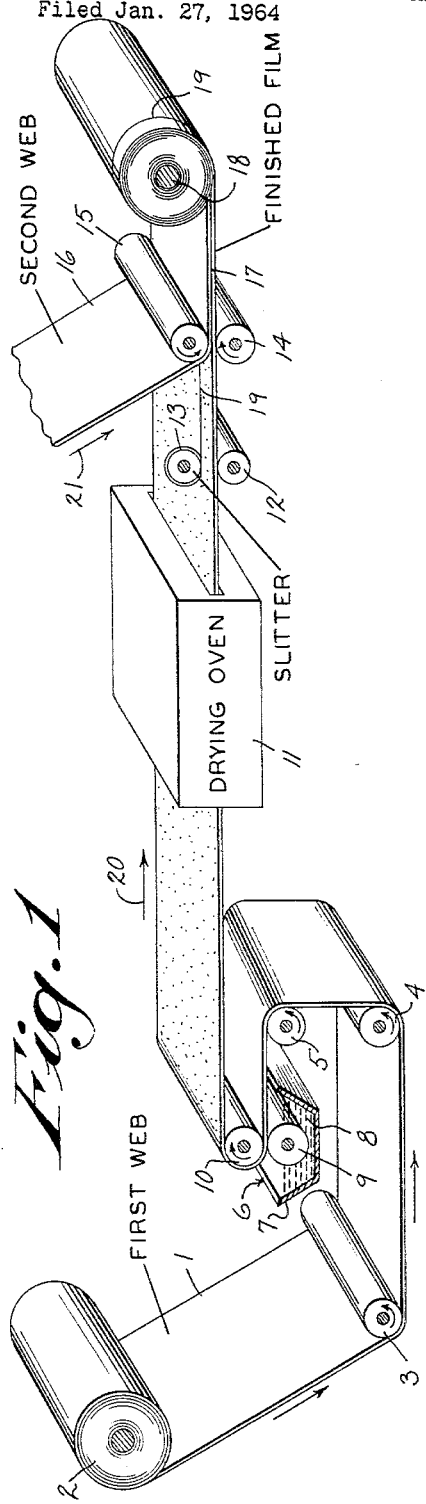
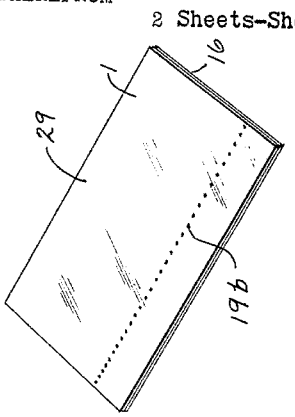
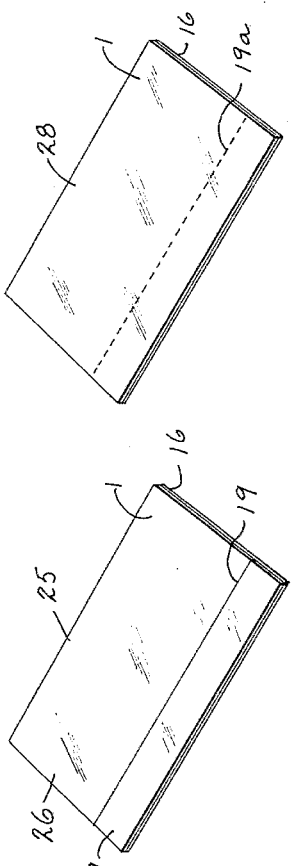
INVENTOR
DOMINIC A. PERINO
BY
*Tunald J. Carser*
ATTORNEY

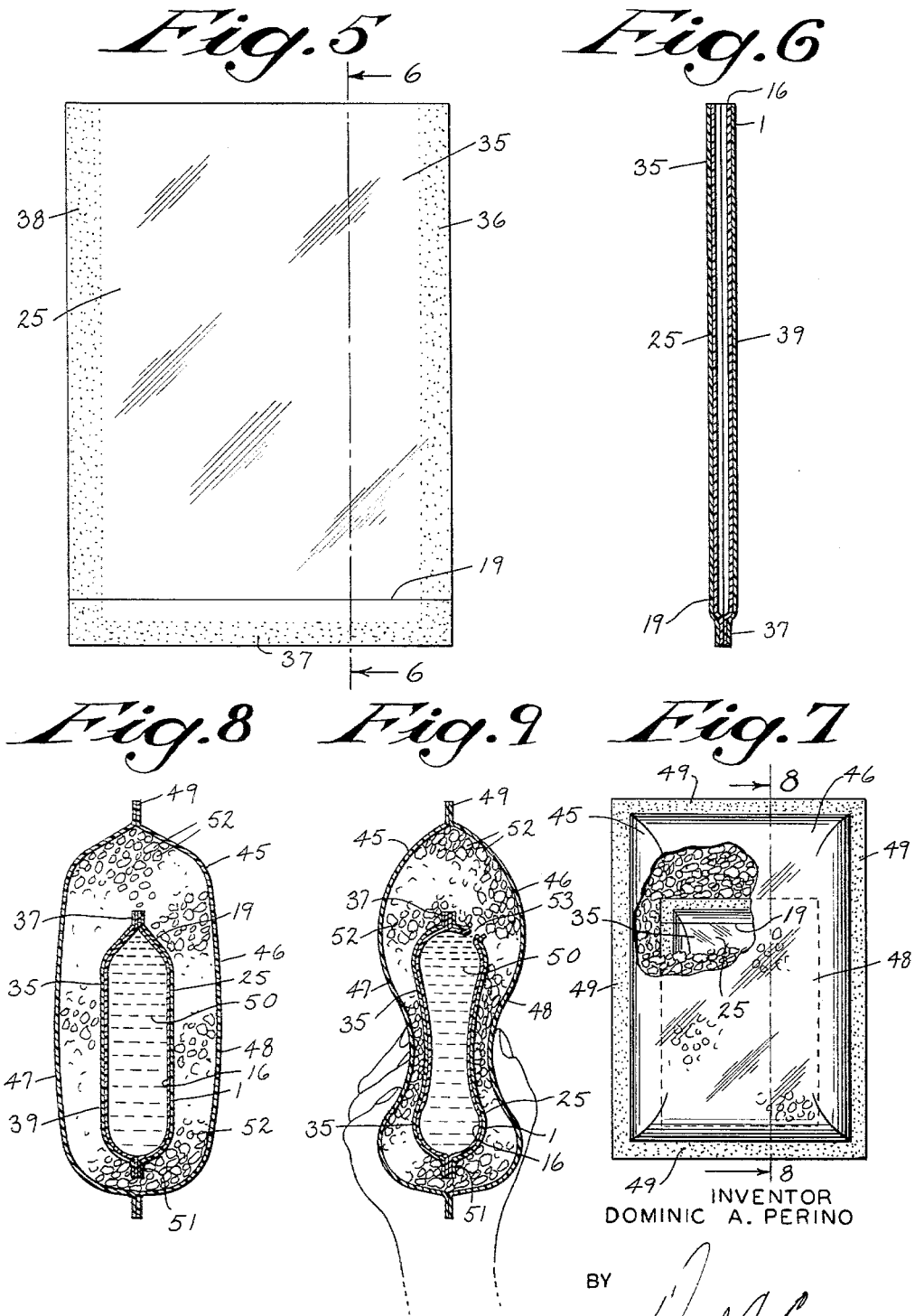

United States Patent Office 3,250,384
Patented May 10, 1966

3,250,384
MULTIPLE LAYER RUPTURABLE PACKAGING
FILM AND CONTAINERS THEREFROM
Dominic A. Perino, Bayside, Wis., assignor to Milprint,
Inc., Milwaukee, Wis., a corporation of Delaware
Filed Jan. 27, 1964, Ser. No. 340,423
9 Claims. (Cl. 206—47)

This invention relates to flexible multiple-layer packaging films wherein at least one of the layers includes a line of severance so that a container made from the film may be opened by rupture along the line of severance. In its more particular aspects, this invention relates to a method for the manufacture of flexible film of the foregoing type, containers made from the film, and packages including a combination of a container of the specified type and a commodity packed within the container.

Some packaging applications require the use of a closed container, made from flexible sheet material, that can be ruptured upon the application of hand pressure so as to release the contents of the container. A typical application of this type would be a package having a sealed outer envelope or container surrounding a sealed inner container where the inner container enclosed material for admixture with the material in the outer container at a desired time. For example, the inner container may contain water and the outer container a material to be mixed with water to produce a particular effect, with the two ingredients packaged to be kept separate from one another until intermixing is desired, at which time the inner container is opened to enable its contents to flow therefrom and mix with the material in the outer container. It has been found that flexible packaging materials currently available for use as the inner container in this type of packaging application are not completely satisfactory since they are sometimes too difficult to rupture at the desired time or they sometimes rupture prematurely and cause mixing of the materials before it is desired. Therefore, one of the objects of this invention is to provide a flexible packaging film for conversion into containers that will be easily rupturable when filled or partially filled with a liquid, or finely divided solid that behaves like a liquid, upon the application of hand or manual pressure.

Another object is to provide a flexible packaging film utilizing a plurality of layers of dissimilar materials wherein at least one of the layers carries a line of severance that is formed before the various layers are joined together and wherein a container made from said material can be easily rupturable along the line of severance. A related object is to provide a two-layer material wherein one layer has the line of severance and the second layer is a contiguous member wherein the line of severance is formed in the first layer before the second layer is joined thereto.

Another object of this invention is to provide a multiple-layer packaging film, preferably a two-layer film, in which at least one of the layers has a line of severance formed before the layers are joined together and wherein a container made from the material will rupture along said line of severance with a rapid quick opening action instead of a slow, leaking-type opening action.

Another object of this invention is to provide a two-layer packaging film of dissimilar materials wherein one layer is a material of a relatively high elongation and the second layer is a material of a comparatively low elongation, in which the two layers are firmly joined to one another and the layer of low elongation has a line of severance formed therein prior to joinder of the two layers so that a container made from said material can be ruptured rapidly along the line of severance.

Another object of this invention is to provide a method for the manufacture of multiple-layer flexible packaging films wherein a first layer is advanced along a predetermined path, severed in a longitudinal direction, and then joined to a second layer to provide a multiple-layer packaging film wherein one layer has a line of severance along which the film may be ruptured.

Another object of this invention is to provide a container made from a pair of superposed sheets of flexible packaging material, each sheet of material being formed of at least two layers, and wherein at least one of the sheets of material is formed of two layers and one layer carries a line of severance so that the sheet can be ruptured along the line of severance in order to open the container to permit escape of materials packaged within the container.

Another object of this invention is to provide a package comprising a liquid or finely divided solid that behaves as a liquid, packaged in a container wherein the container is manufactured from a pair of superposed sheets of flexible packaging material, at least one sheet of which comprises a two-layer film of dissimilar materials having different percentage of elongation and wherein the film having the lowest percentage of elongation carries a line of severance, so that application of hand or manual pressure to the package will cause the hydraulic forces then developed to rupture the container along the line of severance formed to enable the contents to escape from the container.

The foregoing and other more specific objects will appear in the description which follows. In the description, reference is made to the accompanying drawings which form a part hereof and in which specific embodiments of this invention are illustrated. These forms will be described in detail to enable those skilled in the art to practice this invention, but it is to be understood that other embodiments of the invention may be used and that structural changes in the embodiments described herein may be made by those skilled in the art without departing from the true scope of the present invention. The scope of the present invention is best defined by the appended claims and limitations set out in the following detailed description need not be taken in a limiting sense except insofar as they may be incorporated in the claims.

FIG. 1 is a schematic view of a process according to this invention;

FIG. 2 is an enlarged perspective view of one form of the films of this invention as produced by the process shown in FIG. 1;

FIG. 3 is an enlarged perspective view of a second form of the films of this invention;

FIG. 4 is an enlarged perspective view of a third form of the films of this invention;

FIG. 5 is a front plan view of a container in accordance with this invention;

FIG. 6 is a side sectional view of the container of FIG. 5 taken along the plane of line 6—6 in FIG. 5;

FIG. 7 is a front plan view, with a portion broken away, of a composite package utilizing an inner container of this invention of the type shown in FIG. 5;

FIG. 8 is a side sectional view of the package of FIG. 7 taken along the plane of line 8—8; and FIG. 9 is a view the same as FIG. 8 showing the use of hand pressure to open the inner container of the package shown in FIG. 7.

*Method for manufacture of the film*

FIG. 1 illustrates in schematic form a method of this invention as used to produce films of this invention. In FIG. 1, a first web 1 of suitable material is unwound from a supply roll 2 thereof and advanced in the direction of the arrow 20 about guide rollers 3, 4 and 5 to pass through an adhesive applicator station 6. The adhesive applicator station 6 comprises a tank 7 of fluid or semi-fluid adhesive 8 together with a pair of opposed rotatable rollers 9 and 10. This applicator station will be recognized as well-known in the art. The first web 1 after it passes over the guide roller 5 proceeds between the rollers 9 and 10 so that a thin coating of adhesive will be applied to the side of the first web 1 that contacts the outer surface of roller 9. Thereafter, the first web 1 passes over the roller 10 and through a drying oven 11 to dry the adhesive applied at the applicator station 6. The adhesive coating is illustrated by the stippling effect shown on the first web in FIG. 1.

After departing the drying oven 11, the first web 1 is advanced between a back-up roller 12 and a slitter 13. The slitter 13 is shown herein as a rotatable disc having a thin cutting edge, although it may also comprise a suitably arranged knife edge or other cutting device. The purpose of the slitter 13 is to cut a longitudinal line of severance 19 in the advancing first web 1. The line of severance may be of various constructions such as a continuous cut line, or a line of short cuts separated by uncut portions of the web, or a series of separated perforations or dots.

After passing under the slitter 13, the first web 1 proceeds between the nip of a pair of oppositely disposed pressure rollers 14 and 15. At this stage of the process, a second web 16 is also fed, in the direction of the arrow 21, through the nip of the pressure rollers 14 and 15 so as to contact the adhesive coated side of the first web 1 and be firmly joined to the first web upon passage of the two webs through the pressure rollers 14 and 15. Thus, the second web 16 is laminated to the first web 1 by passage through the pressure rollers to form the finished film 17 consisting of the first web 1 and the second web 16 firmly joined together. The finished film is then led around a rewind roller 18 for storage and ultimate use and/or shipment.

The process as described above and shown in FIG. 1 is essentially a lamination process wherein the first web is longitudinally slit before the second web is joined to the first web. Various steps illustrated in FIG. 1 can be substituted for by those skilled in the art as long as the basic features of first slitting one advancing web and thereafter joining a second web to the slit first web are preserved. While a laminating process is illustrated, it is also possible to use an extrusion process wherein the second web 16 is an extruded web of thermoplastic material either from an extruder or from a chill roll. Where extrusion is issued, the second web 16 should be at least viscous enough to be in self-sustaining condition even though it is not necessary that it be cooled to room temperature or to a set film condition. When extrusion is used to form the second web 16, the pressure rollers 14 and 15 may be replaced by a chill roll in combination with a suitable back-up roll in order to join the two webs together and to accommodate a second web 16 that may not be cooled completely to a set film temperature. In actual practice an extrusion process of the type disclosed in the United States patent application Serial No. 209,076 of Reddeman, entitled "Low Temperature Polyolefin Extrusion Coating Process," filed July 11, 1962 has proved to form films in a manner of the character useful in the present invention.

In an appropriate situation, the adhesive application to the first web can be omitted if the second web has sufficient adhesion to the first web as to be strongly joined thereto without the interposition of an adhesive layer; this may be so particularly when extrusion coating is used for production of the second web 16 or when it is otherwise in a softened condition.

As indicated previously, FIG. 1 is schematic in form and omits many of the drives and associated equipment that will be necessary to operate the various rollers and other appliances used in the process. However, suitable mechanisms and apparatus will be apparent to those skilled in the converting art upon study of this description and the accompanying drawings.

The finished film

FIGS. 2, 3 and 4 illustrate several forms of the films of this invention that can be made according to the method shown in FIG. 1. FIG. 2 illustrates a sheet 25 of the finished film made as shown in FIG. 1, including one layer comprising the first web 1 and a second layer comprising the second web 16. Both layers are firmly joined to one another. As indicated, the line of severance 19 is a continuous cut line extending from one end of the sheet 25 to the other and passing entirely through the depth of the layer of first web 1 throughout its entire length. Thus in this form, one portion 26 of the layer of first web 1 is completely separated from the other portion 27 of the layer of first web 1 along the line of severance 19.

FIG. 3 illustrates a sheet 28 also comprising superimposed layers of the first web 1 and the second web 16 firmly bonded to one another wherein the line of severance 19a consists of a series of spaced cut lines extending from one end of the sheet to the other. Each cut line extends entirely through the layer of first web 1 but the two portions of the layer of first web 1 on the opposite sides of the line of severance 19a are joined to one another along the short uncut intervals between the short cut lines forming the line of severance. This form of film material is easily made according to the method illustrated in FIG. 1 by substituting an appropriate slitter that has a cutting edge designed to produce the interrupted cut lines of line of severance 19a.

FIG. 4 shows a third sheet 29 of film material of this invention also comprising superimposed layers of first web 1 and second web 16 firmly joined to one another but showing a third construction for the line of severance. In this embodiment, the line of severance 19b extends across the layer of first web 1 in the sheet 29 and comprises a series of spaced perforations wherein each perforation extends entirely through the layer of first web. Again, this form of the line of severance can be produced with the process as illustrated in FIG. 1 by the substitution of an appropriate perforating device for the slitter 13.

In order for containers produced from the film of this invention to exhibit the required quick rupturing effect, it is further necessary that the materials for the first and second layers in the film be dissimilar materials each having specific elongation characteristics. It has been found that the first web should comprise flexible sheet material having a low percentage of elongation and the second web should be of flexible material having a relatively high percentage of elongation. Further, it has been found desirable that the first web exhibit a rate of elongation of 100% or less and that the second web should exhibit a rate of elongation of 200% or more. The percentage of elongation as the term is used herein and in the claims is that measured in accordance with ASTM D882, procedure B. Thus the layer of first web in the sheet materials of this invention is to be made from material that has a low degree of extensibility and the layer of second web is to be of material that has a higher degree of extensibility, preferably at least twice that of the first layer. As to terminology, extensibility is measured by the percentage elongation according to the foregoing procedure. Materials for the layer of first web useful in the present invention include the following: films of polyester polymers such as polyethylene terephthalate and linear co-polyesters; films of rigid vinyl chloride homopolymers and copolymers; films of vinylidene chloride homopolymers and copolymers; films of polyvinyl fluoride; films of polytrifluorochloroethylene; polystyrene films; paper; cellulosic films such as coated, uncoated, or laminated cellophanes; including Saran, vinyl and nitrocellulose coated cellophane films and polyester laminated cellophane; and polypropylene films; particularly oriented polypropylene. Each of the foregoing materials should have a percentage of elongation less than about 100% to be satisfactory.

Materials useful for the layer of second web include films and coatings of the following materials: polyethylene, including low, medium and high density polyethylene; polypropylene, particularly oriented polypropylene; nylon; polytetrafluoroethylene; rubber hydrochloride (Pliofilm); non-rigid vinyl chloride-acetate copolymers; and non-rigid polyvinyl chloride film. Each of the foregoing types of materials should have a percentage of elongation over about 200% to be useful as second layer materials in this invention.

In addition to the preceding elongation characteristic, the layer of second web has added functional utility when it is heat sealable. It may comprise either a thermoplastic material that is inherently heat sealable due to its softening action under heat or an inherently non-thermoplastic material that is rendered heat sealable by the application of a heat sealable coating or lacquer. This facilitates formtion of containers from the films by enabling the use of heat seal seams for joinder of contacting sheets to define the containers; for such purpose, the films are arranged with the heat sealable layers of second web as the interior surface of the containers to abut a layer of the same or dissimilar heat sealable material. By the term "heat sealable" as used herein is meant the property of softening or fusing to form a satisfactory bond between abutting portions of material upon the momentary application of heat and pressure. The temperatures employed are above the softening temperature of the material being heat sealed when it is thermoplastic and inherently heat sealable, or above the softening temperature of the heat seal coating in the case of a material that carries such a coating; the pressures generally vary between less than one to fifty pounds per square inch; and the "dwell time" during which the contacting material is subjected to the heat and pressure is normally from a fraction of a second to several seconds.

Some materials appear on the list of suitable materials for the first web and the list of suitable materials for the second web. The reason for this is that some materials can be manufactured or compounded so as to have a percentage elongation in either the low range desired for the first web or the higher range desired for the second web. Although the films are illustrated herein as comprising two layers, it is also possible in some instances to utilize more than two layers, provided at least one layer includes a line of severance extending through it in the manner described above with reference to the first web of the finished films described herein for the purposes of illustration. Also, in the two-layer film as herein illustrated, one or more of the layers may carry a coating such as the heat-seal coating or other type of functional coating, although this is also not illustrated in the accompanying figures.

Containers from the finished films

FIGS. 5 and 6 illustrate, respectively, plan and sectional end views of one form of container that may be manufactured from the finished films of this invention. FIG. 5 illustrates a pouch type of container formed from a pair of superposed sheets of material heat sealed along three of their abutting marginal portions, as at 36, 37 and 38, to form a pouch of sheet material having an open end for the reception of the commodity to be packaged within the container. As indicated in FIG. 6, one of the sheets of material used to form the container 35 comprises a sheet of material 25 as illustrated in FIG. 2 and the superposed second sheet 39 is shown as also comprising layers of first web 1 and second web 16. In sheet 39, the layers may be of different material than the layers in sheet 25 and single layer, coated or other suitable materials also may be used for the sheet 39. The sheet 25, however, is constructed in accordance with this invention and includes a line of severance 19 extending through the first layer 1 forming its outer surface. Referring back to FIG. 5, the line of severance 19 extends across the container between its two side edges. The line of severance is indicated herein as being disposed near one end heat seal seam 37, although it can be arranged at other positions about the body of the container.

Other styles of containers than the pouch 36 illustrated in FIG. 5 may be fabricated from the finished film of this invention. While it is generally sufficient to use the film of this invention for only one wall of the container, it is also possible to use it for both walls thereof. It is desirable that the line of severance be positioned on an exterior surface of the container wall although this may be varied in some packaging applications.

Packages using containers of the finished films

FIGS. 7–9 illustrate a typical packaging use for the containers 35 described above. In FIG. 7 there is shown a package 45 comprising a sealed outer container 46 and a sealed inner container 35. The outer container 46 consists of a pair of superposed sheets 47 and 48 of flexible packaging material joined together along their abutting marginal portions by heat seal seams 49 to form a closed container. The inner container 35 is filled with water 50 and heat-sealed at 51 in order to form a closer container. The closed container 35 is disposed inside of the outer container 45 in such a manner that the line of severance 19 is positioned at the top. Inside the outer container 55, and outside the inner container 35, there is packaged a solid material 52 which is desired to be mixed with the water in the inner container 35 at the appropriate time.

Turning now to FIGS. 8 and 9, the arrangement of the inner and outer containers and the respective materials packaged therein with respect to one another is again clearly shown, as well as the manner in which the inner container is to be ruptured upon the application of a suitable force in order to allow the water to escape therefrom and admix with the solid material 52 in the outer container. During storage and shipment of the package 45, the relative arrangement of the inner and outer containers is as indicated in FIG. 8 and the composite package may be kept in a suitable box or such other form of outer receptacle as may be necessary. When it is desired to achieve admixture of the two separately packaged materials, the user grasps the package in his hand and squeezes the same as indicated in FIG. 9 so as to exert a compressive force against the outer container and cause the water in the inner container 35 to be forced against the upper end of the inner container and exert hydraulic pressure against the portion of the container underlying the line of severance 19. The hand pressure is continued until the hydraulic pressure is sufficient to rupture the inner container 35 along the line of severance 19 and thereby enable the water in the container to escape through the opening 53 formed upon rupture along the line of severance, and intermix with the solid material 52 in the outer container. It has been found that, with the containers 35 of this invention, this rupturing action is quick so that the water can be removed from the inner container in a relatively short time instead of slowly dribbling or leaking from the container, thereby achieving a rapid admixture of the two materials. At the same time, the containers 35 of this invention are strong enough to resist premature rupture of the inner container along the line of severance when the package such as 45 is stored and prior to its time of intended use. Both of these features are important to the type of packaging uses envisioned for containers of this invention. It is believed that the provision according to this invention of a container such as the inner container 35 having an inner layer of a material having a high percentage of elongation firmly joined to an outer layer having a low percentage of elongation and carrying a line of severance provides these important features and enables the attainment of a quick opening container that can still be maintained closed until it is desired to be opened.

A package of the general type described above is shown in U.S. Patent No. 2,925,719 comprising a dry refrigerating chemical, such as ammonium nitrate, in an outer container and water in an inner container. Admixture of the two materials produces an endothermic reaction that yields a cold solution. Another use of a package of the above general type may incorporate a resin as the first material in the outer container and a catalyst for the resin as the second material in the inner container, in which the catalyst would mix with the first material upon rupture of the inner container along the line of severance. A further use may be the packaging of a color dye for oleomargarine in an inner container of this invention disposed in an outer container packaging the uncolored oleomargarine. Additionally, packaging uses involving containers of this invention without an outer container are envisioned. Although a liquid is shown herein as the material in the inner container, a paste-liquid material or a finely-divided solid material can also be used therein as long as the material is deformable so as to exert pressure against the container wall under the line of severance upon the application of a compressive or constricting force.

*Example*

For the purposes of illustration, the following is set forth as a specific example of the present invention. A web of 50 gauge (½ mil) polyester film (Mylar polyethylene terephthalate) was advanced through an adhesive applicator station wherein it received a very thin coat of a polyester-polyurethane adhesive, applied at a coating density of about ½ pound of coating solids per 3,000 square feet of web surface area. After drying the adhesive, the web was led through a slitted device that cut a line of severance in the web of the style shown in the material of FIG. 2 above. After being slit, the web was led into the nip formed by a chill roll and a back-up roll. At this point, a web of extruded polyethylene, approximately 2¼ mils thick, was also led between the nip of the chill roll and the back-up roll and joined to the coated web of polyethylene terephthalate. The web of polyethylene was extruded from a suitable extruder, cooled to a film-forming condition, and electronically treated by Corona discharge before being joined to the first web. Upon passage through the chill roll and the back-up roll, the two webs were firmly joined to one another to produce the finished film.

Pouches of the configuration of the container 35 in FIGS. 5 and 6 above were formed using a sheet of the above web as one wall. The second wall was a sheet using the same polyester and polyethylene layers, except it did not have a line of severance. The two sheets were heat sealed together to form the container with the line of severance positioned approximately ½ inch from the inner edge of one of the end seals in the pouch. Pouches of this type were filled with water, heat sealed across the open end, and used as the inner container in a package of the type illustrated in FIGS. 7–9. An outer container, larger than the inner container, was made using the same polyester-polyethylene film as the inner container except that it did not have a line of severance. A solid chemical (such as ammonium nitrate), was packaged in the outer container, the filled closed inner container inserted, and then the outer container was sealed.

It was found that a compressive force exerted upon the exterior of the outer container, such as by squeezing the package by hand, would cause the water in the inner container to develop hydraulic pressure that, when exerted against the wall of the inner container underlying the line of severance, would cause rupture of the inner polyethylene layer. It appeared that the polyethylene would first elongate and then break all the way across the pouch in the area underneath the line of severance when the hydraulic pressure of the water exceeded the burst strength of the unsupported polyethylene in this area. It is believed that the layer of first web (polyester) joined to the polyethylene restricted elongation of the polyethylene because it has a much lower percentage of elongation, on the order of 75%, as compared to 500% for the polyethylene. This restricting or reinforcing action is thought to concentrate the hydraulic force from the contents against the thin unsupported portion of the inner (polyethylene) layer underlying the line of severance so that this very thin portion (perhaps about 0.001″ wide) is subjected to a substantial amount of stress and quickly exceeds its elastic limit. The rupture action was rapid and the water flowed through the opening thusly formed and mixed with the material packaged inside the outer container.

There has thus been described a method for the manufacture of a multiple-layer flexible packaging film wherein one of the layers has a substantially lower percentage of elongation than a second layer of the film and wherein the layer with the lower elongation carries a line of severance that was formed therein prior to the two layers being joined together. Particularly effective results are obtained when the layer of highest elongation has a percentage of elongation no less than about twice that of the layer having the line of severance; for the purposes of this invention, percentage of elongation is that measured in the direction perpendicular to the line of severence and may be either the machine or cross direction of the materials depending upon the orientation of the line of severance relative to the material. The line of severance includes cut lines extending through the one layer so that there is a very thin separation between the two portions of the layer on opposite sides of the line of severance to produce a thin unsupported section of the second layer that ruptures under specified conditions of use. The novel films thusly formed can be converted into containers that, after being filled with a commodity, may be opened by exerting force on the commodity so that the commodity can exert pressure on the thin section of container wall underlying the line of severance so as to cause rupture thereof to form an opening for the escape of the commodity packaged in the container. While this invention has been described with reference to several specific embodiments for the purpose of illustration, it is to be understood that it is intended to cover all changes and modifications of the exemplary embodiments, as well as other embodiments, which do not constitute a departure from the scope and spirit of this invention.

I claim:

1. A container for packaging commodities comprising, in combination:
    (1) a pair of opposed side walls joined together to form a container;
    (2) at least one of said side walls comprising flexible film including at least two layers firmly joined to one another,
        (a) one of said layers comprising material having a percentage of elongation at least twice the percentage of elongation of the other layer, and
        (b) said other layer including a line of severance formed therein prior to joinder of the two layers; and
    (3) the container, when closed and having deformable material enclosed within it, being rupturable along said line of severance upon manual deformation of the material to thereby open the container.

2. A container for packaging commodities comprising, in combination:
    (1) a pair of opposed side walls joined together to form a container;

(2) at least one of said side walls comprising flexible film including at least two layers firmly joined to one another,
    (a) one of said layers comprising material having a percentage of elongation at least twice the percentage of elongation of the other layer, and
    (b) said other layer including a line of severance formed therein prior to joinder of the two layers, and
    (c) said line of severance disposed on the exterior of the container;
(3) the container, when closed and having deformable material enclosed within it, being rupturable along said line of severance upon manual deformation of the material to thereby open the container.

3. A container for packaging commodities comprising, in combination:
(1) a pair of opposed side walls joined together to form a container;
(2) at least one of said side walls comprising flexible film including at least two layers firmly joined to one another,
    (a) one of said layers comprising material having a percentage of elongation of at least 200% and the other layer comprising material having a percentage of elongation of less than about 100%, and
    (b) said other layer including a line of severance formed therein prior to joinder of the two layers;
(3) the container, when closed and having deformable material enclosed within it, being rupturable along said line of severance upon manual deformation of the material to thereby open the container.

4. A container for packaging commodities comprising, in combination:
(1) a pair of opposed side walls, each side wall comprising an inner layer of heat sealable material joined to an outer layer;
(2) heat seal seams joining the inner layer of one side wall to the inner layer of the other side wall to form the container;
(3) at least one of said side walls including a line of severance in its outer layer formed therein prior to joinder of the inner and outer layers, the outer layer of said side wall comprising material with a percentage of elongation less than about 100%, and the inner layer of said side wall comprising material with a percentage of elongation of more than about 200%;
(4) the container, when closed and having deformable material enclosed within it, being rupturable along said line of severance upon manual deformation of the material to thereby open the container.

5. In a package of the type comprising an outer closed container, an inner closed container arranged inside the outer container, a first material packaged inside the outer container and outside the inner container, and a second material packaged inside the inner container, the improvement wherein:
(1) the inner container comprises a pair of opposed side walls joined together to form the container;
(2) at least one of the side walls of the inner container comprises flexible film including at least two layers firmly joined to one another,
    (a) one of said layers comprising material having a percentage of elongation at least twice the percentage of elongation of the other layer,
    (b) said other layer including a line of severance formed therein prior to joinder of the two layers; and
(3) said inner container being rupturable along the line of severance upon the application of a compressive force against the outer container to thereby cause admixture of said first and second materials.

6. In a package of the type comprising an outer closed container, an inner closed container arranged inside the outer container, a first material packaged inside the outer container and outside the inner container, and a second material packaged inside the inner container, the improvement wherein:
(1) the inner container comprises a pair of opposed side walls joined together to form the container;
(2) at least one of the side walls of the inner container comprises flexible film including at least two layers firmly joined to one another,
    (a) one of said layers comprising material having a percentage of elongation of more than about 200% and the other layer having a percentage of less than about 100%,
    (b) said other layer including a line of severance formed therein prior to joinder of the two layers; and
(3) said inner container being rupturable along the line of severance upon the application of a compressive force against the outer container to thereby cause admixture of said first and second materials.

7. In a package of the type comprising an outer closed container, an inner closed container arranged inside the outer container, a first material packaged inside the outer container and outside the inner container, and a liquid packaged inside the inner container, the improvement wherein:
(1) the inner container comprises a pair of opposed side walls joined together to form the container;
(2) at least one of the side walls of the inner container comprises flexible film including at least two layers firmly joined to one another,
    (a) one of said layers comprising material having a percentage of elongation greater than about 200% and the other layer having a percentage of elongation less than about 100%, and
    (b) said other layer including a line of severance formed therein prior to joinder of the two layers;
(3) said inner container being rupturable along the line of severance upon the application of hydraulic pressure from the liquid packaged in the inner container so that said liquid can escape from the inner container through the opening formed therein upon rupture along the line of severance for admixture with said first material, said hydraulic pressure being developed by the application of a compressive force against the outer container.

8. A package according to claim 7 wherein the liquid is water.

9. A package according to claim 7 wherein:
(4) the side walls of the inner container each comprise an inner layer of heat sealable material and an outer layer, and the inner container is defined by heat seal seams joining together abutting portions of the inner layers of each side wall; and
(5) the line of severance is formed in the outer layer of one of the side walls of the inner container.

References Cited by the Examiner
UNITED STATES PATENTS

| | | | |
|---|---|---|---|
| 2,714,974 | 8/1955 | Sawyer | 206—47 |
| 2,858,057 | 10/1958 | Mullinix | 229—51 |
| 2,956,723 | 10/1960 | Tritsch | 229—3.5 |
| 3,017,302 | 1/1962 | Hultkrans | 229—3.5 |
| 3,054,703 | 9/1962 | Brasure. | |
| 3,154,225 | 10/1964 | Wadlinger et al. | 206—56 |

THERON E. CONDON, *Primary Examiner.*

W. T. DIXSON, *Assistant Examiner.*